(12) United States Patent
Engelmann

(10) Patent No.: US 6,192,933 B1
(45) Date of Patent: Feb. 27, 2001

(54) BACKFLOW PREVENTION ASSEMBLY

(75) Inventor: Lester Engelmann, Woodland, CA (US)

(73) Assignee: Watts Investment Company, Wilmington, DE (US)

(*) Notice: Subject to any disclaimer, the term of this patent is extended or adjusted under 35 U.S.C. 154(b) by 0 days.

(21) Appl. No.: 09/454,680

(22) Filed: Dec. 3, 1999

(51) Int. Cl.[7] ................................................. F16K 15/03
(52) U.S. Cl. ........................ 137/613; 137/512; 137/527
(58) Field of Search ........................... 137/613, 614.2, 137/512, 527

(56) References Cited

U.S. PATENT DOCUMENTS

| 828,595 | 8/1906 | Bonser . |
|---|---|---|
| 1,941,694 | 1/1934 | Kilgour . |
| 2,017,033 | 10/1935 | McGuffin . |
| 3,942,349 | * 3/1976 | Williams et al. ................... 72/98 |
| 4,039,004 | * 8/1977 | Luthy ............................... 137/527 |
| 4,231,387 | 11/1980 | Dixon . |
| 4,261,383 | 4/1981 | Prince . |
| 4,284,097 | 8/1981 | Becker et al. . |
| 4,304,255 | 12/1981 | Prince . |
| 4,672,998 | 6/1987 | Kozak, III . |
| 4,989,635 | 2/1991 | Dunmire . |
| 5,046,525 | * 9/1991 | Powell ........................... 137/527 X |
| 5,406,979 | 4/1995 | McHugh . |
| 5,425,393 | 6/1995 | Everett . |
| 5,503,176 | 4/1996 | Dunmire et al. . |
| 5,584,315 | * 12/1996 | Powell ........................ 137/614.2 X |
| 5,947,142 | 9/1999 | Nimberger et al. . |
| 6,021,805 | 2/2000 | Horne et al. . |

OTHER PUBLICATIONS

"Series 994/994RPDA" © 1997, Watts Regulator, Watts Industries, Inc., Water Products Division—Safety & Control Valves, North Andover, MA.

"Series 774/774DCDA, 774X/774XDCDA" ©1998, Watts Regulator, Watts Industries, Inc., Water Products Division—Safety & Control Valves, North Andover, MA.

* cited by examiner

Primary Examiner—Kevin Lee
(74) Attorney, Agent, or Firm—Fish & Richardson, P.C.

(57) ABSTRACT

A backflow prevention assembly has a unitary housing with a passage therethrough, two threaded regions formed in an inner surface of the unitary housing, and two valve assemblies positioned in the passage to prevent fluid flow in a direction. Each valve assembly has an annular mount having a threaded outer surface that engages one of the threaded regions on the inner surface of the housing. The threads can be formed by placing a die having a thread on an outer surface thereof in contact with an inner surface of the unitary housing, and pressing on the outer surface of the housing.

7 Claims, 4 Drawing Sheets

BACKFLOW PREVENTION ASSEMBLY

BACKGROUND

This invention relates to a backflow preventer.

Backflow preventers are principally to prevent contamination of a public water distribution system by reducing or eliminating backflow or back-siphonage of contaminated water into the system.

Usually, the backflow prevention assembly is installed in a pipeline between a main supply line and a service line that feeds an installation, e.g., a hotel, factory or other institution, or even a multiple or single family residence. A backflow prevention assembly typically includes two check valves that are configured to permit fluid flow only in the direction from the main supply line to the service line.

FIG. 1 illustrates a conventional connection between a valve module 40' and a housing 20' of a prior art backflow preventer. As shown, an annular mount 90 having an threaded inner surface 92 and a smooth outer surface 94 is secured to a cylindrical inner surface 96 of housing 20', e.g., by solder 98 or welding 99. The valve module 40' is then screwed into mount 90 to secure it to the housing.

SUMMARY

In one aspect, the invention is directed to a backflow prevention assembly. The backflow prevention assembly has a unitary housing with a passage therethrough, two threaded regions formed in an inner surface of the unitary housing, and two valve assemblies positioned in the passage to prevent fluid flow in a direction. Each valve assembly has an annular mount having a threaded outer surface that engages one of the threaded regions on the inner surface of the housing.

Implementations of the invention may include the following features. The two valve assemblies may be cam-check valves. The threaded regions may be formed by a thread rolling process, e.g., by placing a threaded die against the inner surface of the housing and pressing on an outer surface of the housing. Threaded regions may also be formed in the outer surface of the unitary housing.

In another aspect, the invention is directed to a method of forming threads in a tubular housing. In the method, a die having a thread on an outer surface thereof is placed in contact with an inner surface of a unitary housing having a passage therethrough. The outside of the housing is pressed to drive the inner surface against the threads on the outer surface of the die to form threads on the inner surface of the housing.

Implementations of the invention may include the following features. The thread on the outer surface of the first die may be generally the inverted shape of the threads to be formed on the inner surface of the housing. A second die having a thread formed on an outer surface thereon may be used to press on the outside of the housing. Two valve assemblies may be positioned in the passage to prevent fluid flow in a direction, each valve assembly having an annular mount having a threaded outer surface that engages one of the threaded regions on the inner surface of the housing. A port may be formed in a wall of the housing.

Advantages of the invention may include the following. The backflow prevention assembly is easier to assemble, e.g., in the field, and is less expensive to manufacture than currently available backflow prevention assemblies for similar applications.

Other features and advantages of the invention will become apparent from the following detailed description, including the drawings and the claims.

DETAILED DESCRIPTION

Figure 2:
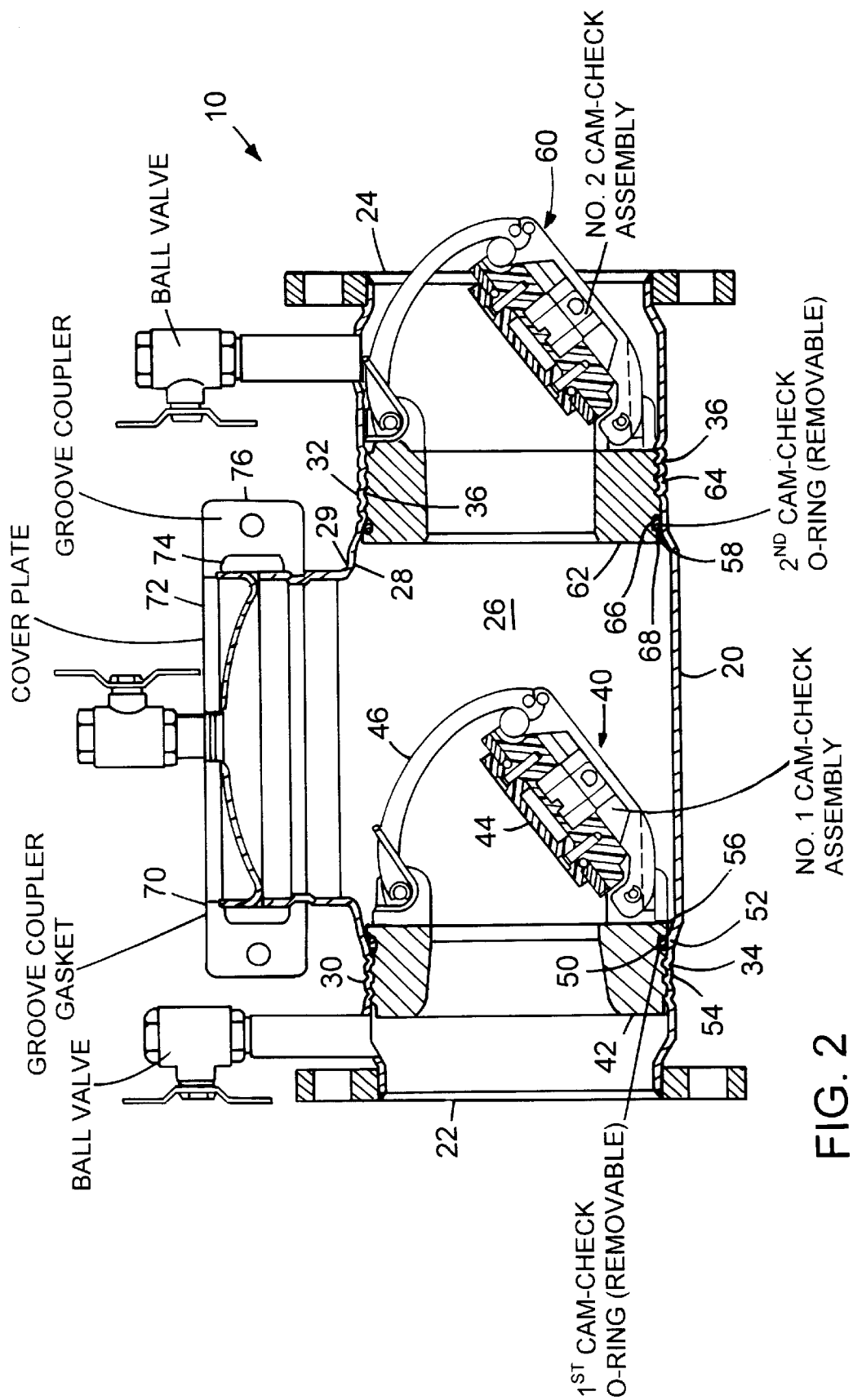
FIG. 2 is a cross-sectional view of a backflow prevention assembly according to the present invention.

Referring to FIG. 2, a backflow prevention assembly 10 includes a unitary tubular housing 20 having a first end 22 and a second end 24. A through bore 26 extends between the ends 22, 24 of housing 20 for the flow of water therethrough. A pair of valve modules 40, 60 are located inside through bore 26 to permit fluid flow from the first end 22 of housing 20 to the second end 24 of housing 20, while preventing fluid flow in the opposite direction. An inner surface 28 of tubular housing 20 includes two threaded annular regions 30, 32 with internal threads 34, 36.

Figure 3:
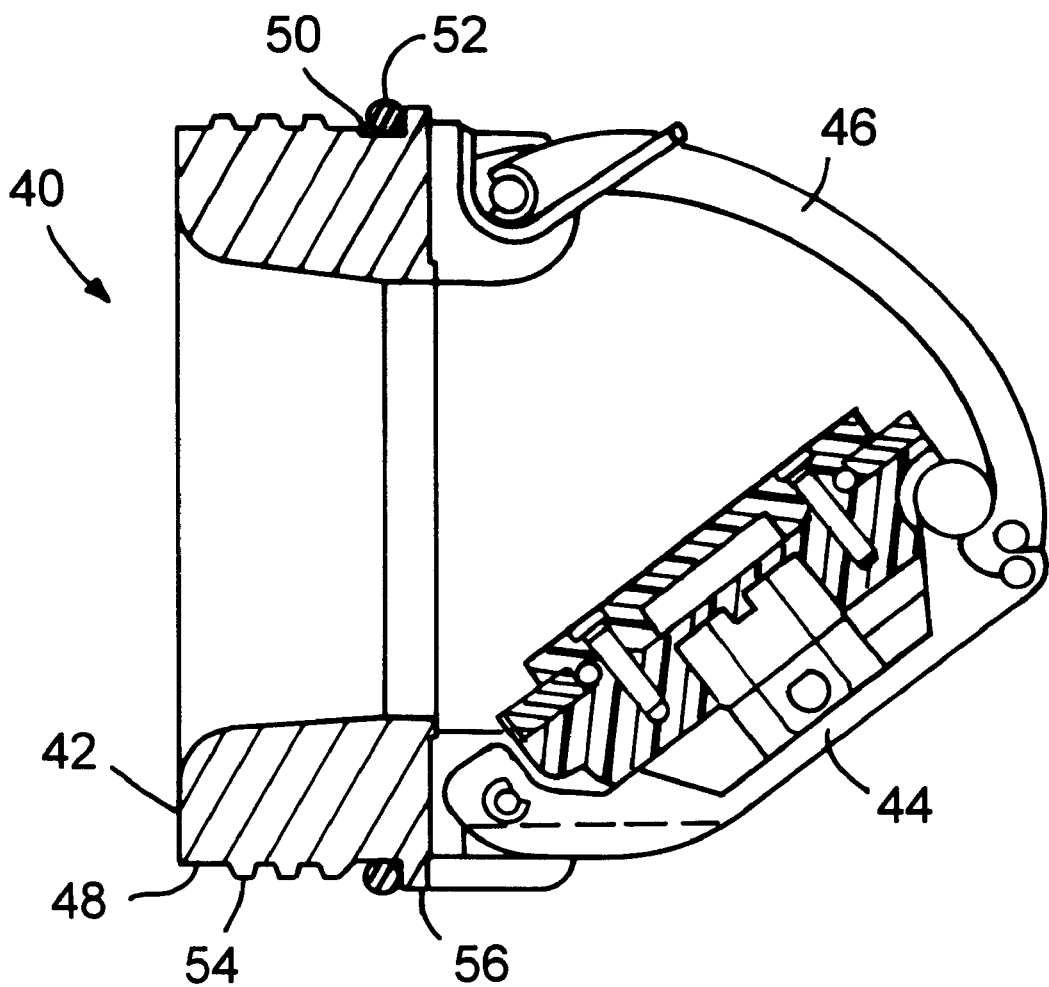
FIG. 3 is a cross-sectional view of a check valve from the backflow preventer of FIG. 2.

Valve module 40 may be a cam-check valve, e.g., Check Assembly Kit No. RK-775CK1 available from Watts Industries, North Andover, Mass., although the invention is applicable to other valves, such as a ball valve. As shown in FIG. 3, cam-check valve 40 includes an annular seat 42, a clapper 44 pivotally connected to annular seat 42, and a cam arm 46 to prevent over-extension of clapper 44. An outer surface 48 of seat 42 includes external threads 54 and an annular recess 50 to secure an O-ring 52 near an end 56 of the seat adjacent clapper 44. When valve module 40 is inserted into through bore 26, external threads 54 on seat 42 cooperate with threads 34 in threaded annular region 30 to secure valve module 40 in housing 20. In addition, O-ring 52 is secured between outer surface 48 of seat 42 and housing 20 to prevent fluid leakage therebetween. A similar cam-check valve, lacking external threads and an annular recess for an O-ring on the outer surface of the seat, is described in U.S. Pat. No. 5,855,224, the entirety of which is incorporated herein by reference.

Returning to FIG. 2, valve module 60 can also be a cam-check valve, and can be constructed in a fashion similar to valve module 40 with an annular seat 62, a clapper pivotally connected to annular seat 62, and a cam arm to prevent over-extension of clapper. An outer surface of the seat includes external threads 64 and an annular recess 66 to hold an O-ring 68. External threads 64 cooperate with internal threads 36 to secure valve module 60 in housing 20. Like valve module 60, O-ring 68 is secured between the outer surface of seat 62 and housing 20 to 20 prevent fluid leakage therebetween. However, in valve module 60, annular recess 66 can be located near an end 58 of seat 62 opposite clapper 60.

Housing 20 includes a port 70 which provides access to bore 26 and valve modules 40 and 60. Port 70 is closed by securing a cover plate 72 to a rim 74 with a groove coupler 76 and a groove coupler gasket 78.

Figure 4:
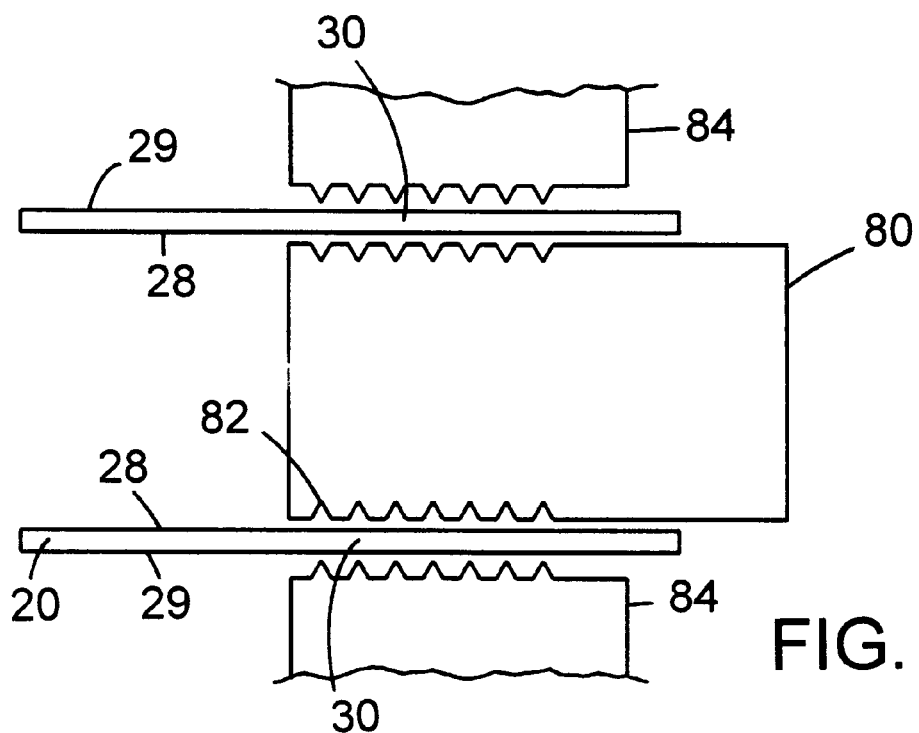
FIG. 4 is a cross-sectional side view illustrating the formation of the threads in the housing of the backflow preventer.
Figure 5:
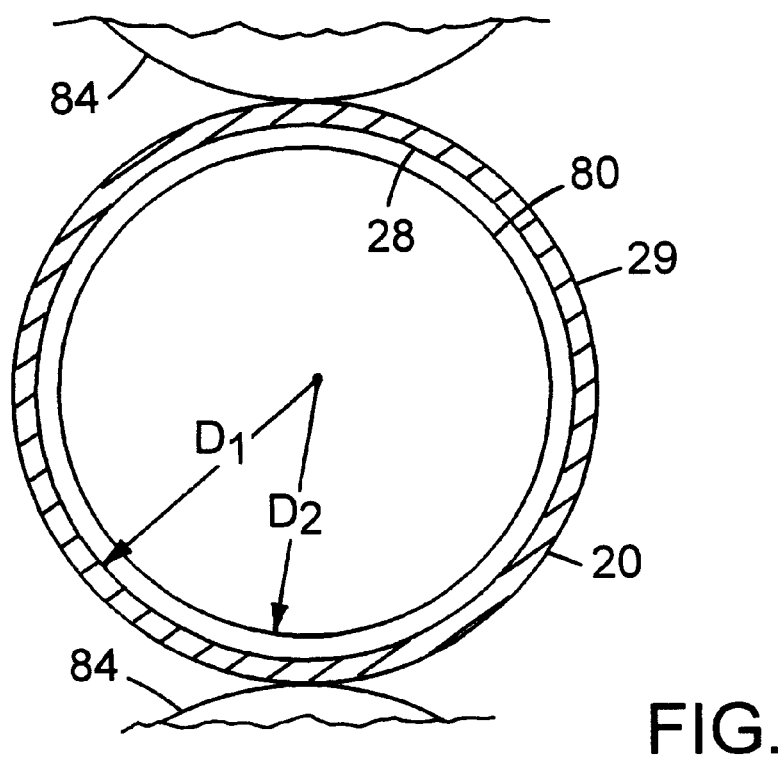
FIG. 5 is a view along line 5—5 of FIG. 4.

Referring to FIGS. 4 and 5, threads 34, 36 are formed in housing 20 by a thread rolling process that uses a threaded internal die 80. Internal die 80 has threads 82 that are the inverse shape of the threads to be formed on housing 20. Unlike conventional thread rolling processes, in which a die with non-inverted threads is held against the outside surface of a housing, in this method, internal die 80 is held against inside surface 28 of housing 20. Specifically, housing 20 begins with an inner diameter D1 that is slightly larger than the major diameter D2 of threads 82 on internal die 80. The threaded internal die 80 is inserted into through bore 26, and external die 84 are positioned around an outer surface 29 of tubular housing 20. The external die force a portion 30 of tubular housing 20 inwardly to mold inner surface 28 of housing 20 to internal die 80, thereby forming threads 34. Alternatively, tubular housing 20 can be held steady and internal die 80 can be moved in an orbit as it is pressed against the inner surface of the housing. In either case, the threads penetrate the blank inner surface to form the thread roots and displace material radially outward to form the die crests. Then the internal die is unscrewed from threaded portion 30 to remove the internal die from the housing. This thread rolling process is then repeated form threads 36 in threaded portion 32 of housing 20.

Alternatively, two die could be inserted into the through bore, and threaded portions 30 and 32 could be formed simultaneously. In addition, the external die 84 can have a thread 86 formed on its outer surface to force the material of the housing into the gaps between threads 82 on internal die 80, thereby also forming threads on outer surface 29. The port 70 could be formed in housing 20 before or after threaded portions 30 and 32.

Since the inner surface of the housing directly contacts the die, the threads more closely match the shape intended by the die than if the a die with non-inverted threads was pressed against the outside surface of the housing. In contrast to other thread forming processes, such as grinding, thread rolling does not remove metal. In addition, the cold forming process can strengthen the threads by work hardening and form reinforcement.

Figure 1:
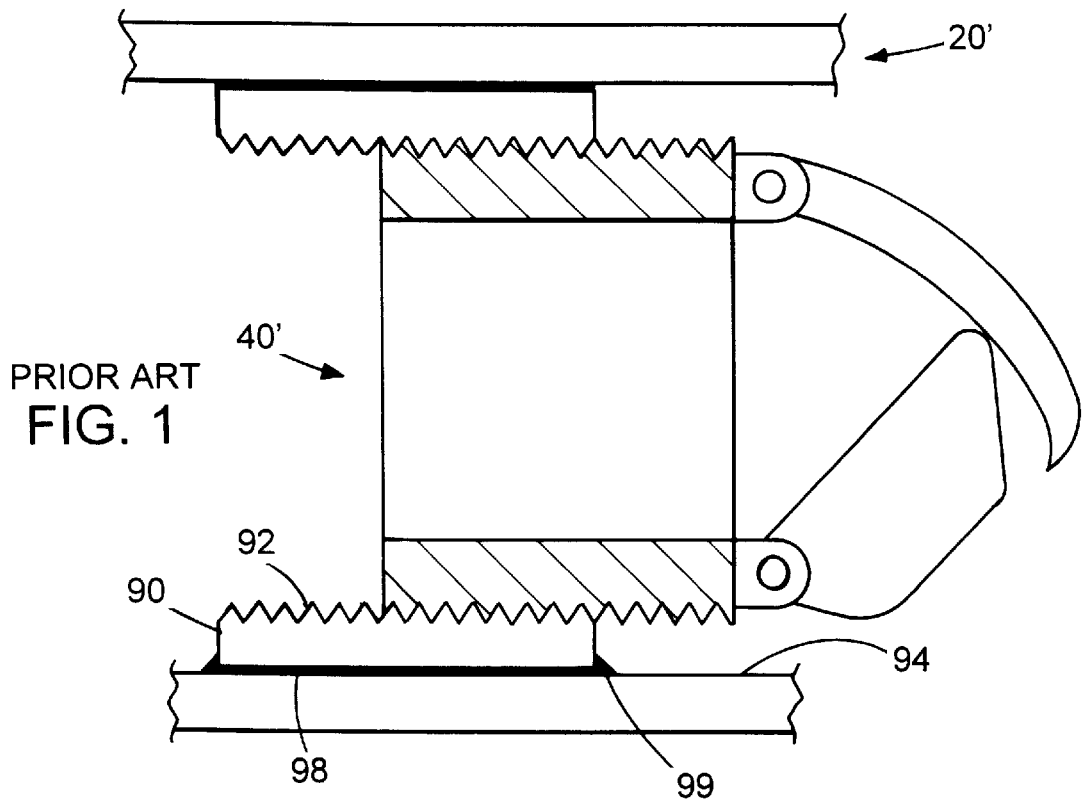
FIG. 1 illustrates a conventional connection between a check valve and a housing in a prior art backflow preventer.
Figure 6:
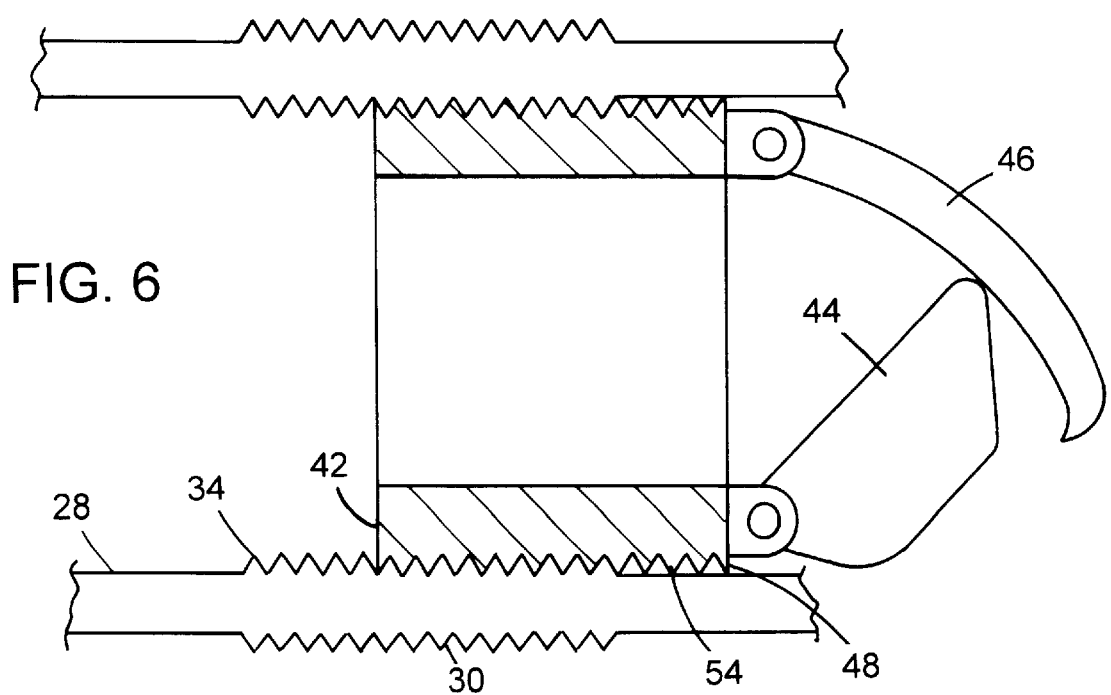
FIG. 6 is an expanded view of the connection of the check valve to the housing in the backflow preventer of FIG. 2.

As previously discussed, in the conventional backflow preventer shown in FIG. 1, the threads are formed in a mount that is soldered to the housing. In contrast, as shown in FIG. 6, threaded portions 30 and 32 are formed directly on inner surface 28 of unitary housing 20, and valve module 40 is secured directly to housing 20, without an intervening mount or soldering, thereby decreasing the time and expense in constructing the backflow prevention assembly 10.

The invention has been described in terms of a preferred embodiment. Other embodiments are within the scope of the claims.

What is claimed is:

1. A backflow prevention assembly, comprising:

a unitary housing having a wall defining a passage therethrough;

two threaded regions formed in an inner surface of the unitary housing by reshaping the wall of the unitary housing; and two valve assemblies positioned in the passage to prevent fluid flow in a direction, each valve assembly having an annular mount having a threaded outer surface that engages one of the threaded regions on the inner surface of the housing.

2. The backflow prevention assembly of claim 1, wherein the two valve assemblies are cam-check valves.

3. The backflow prevention assembly of claim 1, wherein the threaded regions are formed by a thread rolling process.

4. The backflow prevention assembly of claim 1, wherein the threaded regions are formed by placing a threaded die against the inner surface of the housing and pressing an outer surface of the housing.

5. The backflow prevention assembly of claim 1, further comprising threaded regions formed in the outer surface of the unitary housing. a wall of the housing.

6. The backflow prevention assembly of claim 1, wherein the wall defines the passage in a straight configuration.

7. A backflow prevention assembly, comprising:

a unitary housing having a passage therethrough;

two threaded regions formed directly in an inner surface of the housing by placing a die having a thread on an outer surface thereof in contact with the inner surface of the housing and pressing on the outside of the housing to drive the inner surface against the threads on the outer surface of the die; and two valve assemblies positioned in the passage to prevent fluid flow in a direction, each valve assembly having an annular mount having a threaded outer surface that engages one of the threaded regions on the inner surface of the housing.

\* \* \* \* \*